May 6, 1930.　　　　　J. F. O'KELLEY　　　　　1,757,873
STALK CUTTER
Filed May 28, 1929　　　2 Sheets-Sheet 2

WITNESS
J. H. Saylor.

INVENTOR
J. F. O'Kelley
BY
ATTORNEY

Patented May 6, 1930

1,757,873

UNITED STATES PATENT OFFICE

JOHN FRANKLIN O'KELLEY, OF ITASCA, TEXAS

STALK CUTTER

Application filed May 28, 1929. Serial No. 366,656.

This invention relates to a stalk cutter.

An object of the invention is the provision of a simple, efficient and practical farming implement for cutting stalks and chopping them up over at least four rows, the device being capable of being extended for cutting the stalks in eight rows.

A further object of the invention is the provision of a stalk cutter which includes a frame having equal portions extending on opposite sides of a draw bar and carrying knife-equipped rotors which may be revolved by the engagement of the rotors with the ground when in operative stalk-cutting position or the rotors and frame may be elevated above the ground during transportation to or from the field of operation.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figure 1:
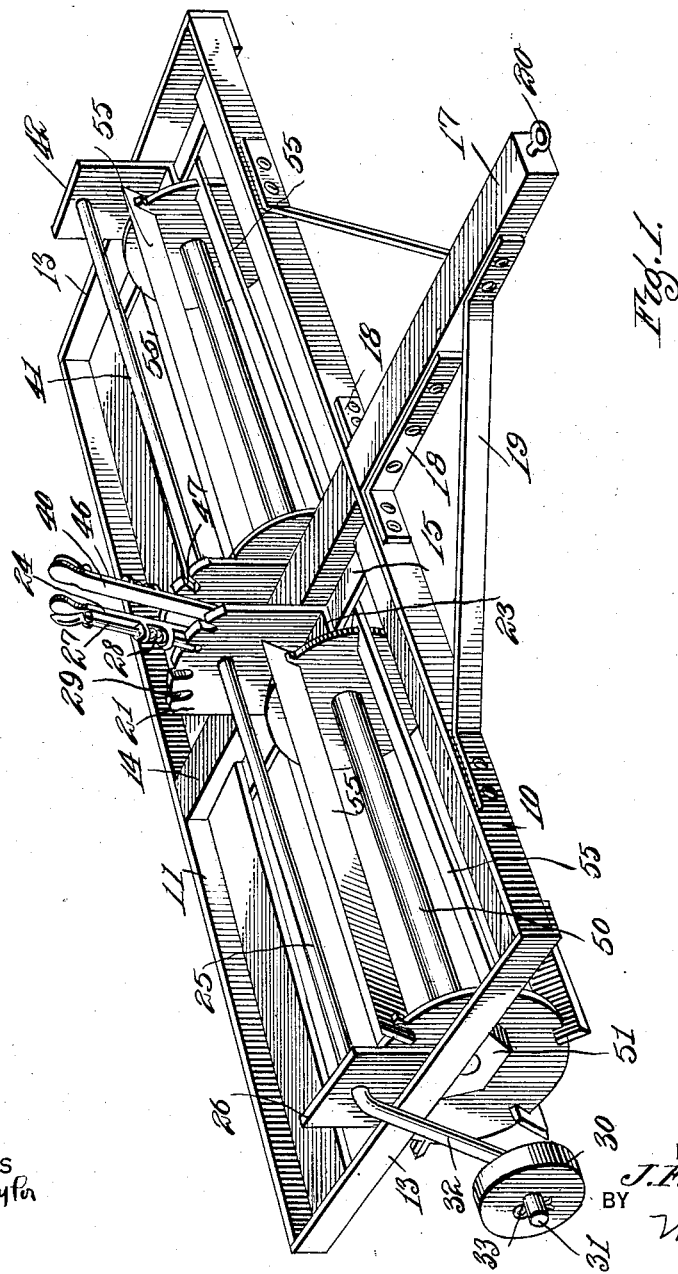
Figure 1 is a view in perspective of a stalk cutter constructed in accordance with the principles of my invention.
Figure 2:
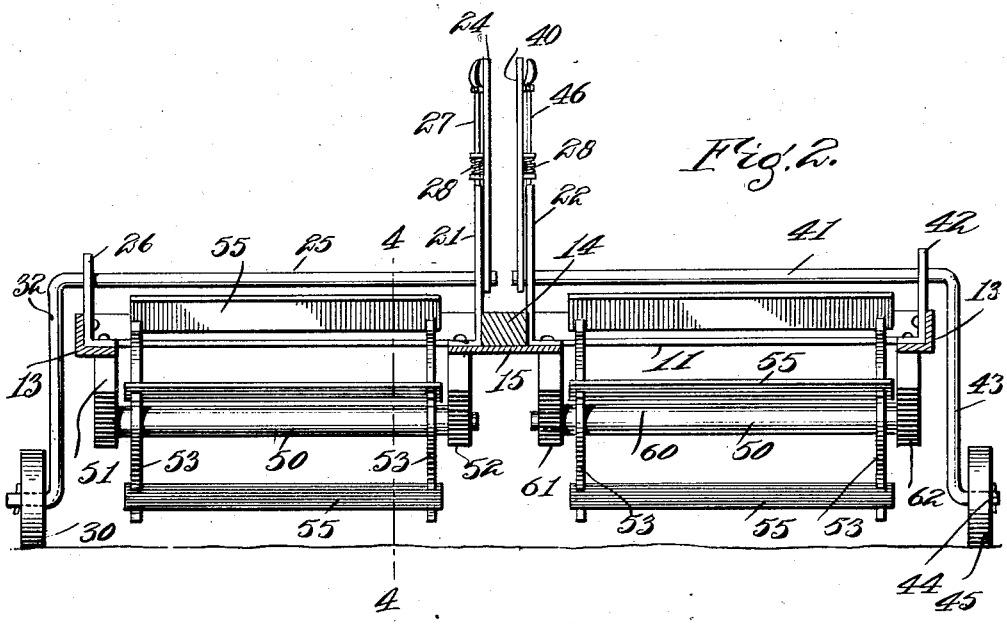
Figure 2 is a transverse vertical section taken along the line 2—2 of Figure 4.
Figures 3, 4:
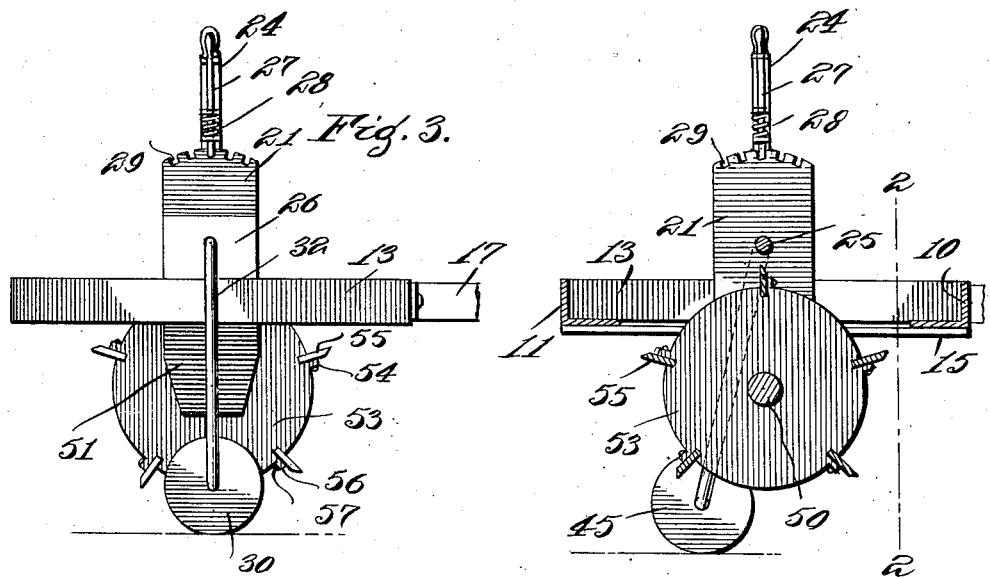
Figure 3 is an end elevation of the cutter.
Figure 4 is a vertical section taken along the line 4—4 of Figure 2.

Referring more particularly to the drawings, 10 and 11 designate a pair of angle arms forming the front and rear members of a rectangular frame. The ends of the members 10 and 11 are connected together by angle irons 13. A centrally disposed beam 14 is connected to the front and rear angle irons 10 and 11 and divides the frame into two sections. A plate 15 is secured to the underfaces of the angle irons 10 and 11 and in close contact with the centrally disposed beam 14.

A draw bar 17 is connected through the front beam 10 by means of angle bars 18, brace bars 19 are connected to the front angle iron 10 upon opposite sides of the draw bar 17 and also to the forward end of the draw bar in advance of the angle irons 18. A hook 20 is secured to the end of the draw bar for connecting the device on a tractor or to a team of horses.

Brackets 21 and 22 have flanges 23 at their lower ends at right angles to the brackets and secured to the plate 15 at the inner walls of the brackets above the centrally disposed beam 14. A lever 24 is secured to a rock shaft 25 mounted in bearings in the bracket 21 and the bracket 26 is secured to one end beam 13.

A pawl 27 actuated by a spring 28 is adapted to engage one of a plurality of notches 29 in the bracket 21 retaining the lever 24 in a predetermined position and also a roller 30 mounted upon an axle 31 carried by an arm 32 taken from the rock shaft 25. A cotter pin 33 or any other well known means may be employed for retaining the roller 30 on the axle 31.

A lever 40 is secured to a rock shaft 41 mounted in bearings in the bracket 22 and in a bracket 42. An arm 43 depends from the rock shaft 41 and is provided with an axle 44 carrying a roller 45. A spring pressed pawl 46 is slidably mounted on the lever 40 and is adapted to engage any one of a plurality of notches 47 formed in the bracket 22 for maintaining the lever 40 and likewise the roller in a predetermined position.

A shaft 50 is mounted in bearings 51 and 52. The bearing 51 is carried by an end angle bar 13 while the bearing 52 depends from one edge of the plate 15. A disc 53 is secured to the shaft 50 in spaced relation and is provided with notches 54 to receive the blades 55. A boss 56 projects from the periphery of a disc and has a threaded passage to receive a set screw 57 which secures the plates 55 in position.

It will be noted that the cutter, generally designated by the numeral 60, is similar in all respects to the cutter just described and has its shaft 50 mounted in bearings 61 and 62 depending respectively from the plate 15 and an end angle bar 13.

The operation of my device is as follows: when the device is transported to or from a field of operation the levers 24 and 40 are moved to their respective positions shown in Figure 1 whereby the arm 32 will be moved to a position where the rollers 30 and 45 will engage the ground in order to prevent the blades 55 from coming in contact with the ground when the machine is not in operation.

When the device is in operative position in a field for cutting four rows of stalks the levers 24 and 40 are moved to a position where the rollers 30 and 35 will be sufficiently elevated to permit the rotors or the cutting members to rest upon the ground. As the device is pulled along the rows the rotors will be revolved by the engagement of the cutters with the ground and with the stalks.

If desired additional frames may be connected to opposite sides of the device with the inner ends of the frames being removably connected to the end angle bars 13 in any approved manner. These additional frames are provided with cutters similar to the cutters shown in Figure 1. By this construction the stalks in four additional rows may be cut.

I claim:

1. A stalk cutter comprising a frame, a beam connected to the frame intermediate the ends thereof and dividing the frame into a plurality of sections, a plate secured to the frame and to the beam, brackets located upon opposite sides of the beam and connected to the plates, brackets projecting from the ends of the frame and disposed in alinement with the first-mentioned brackets, said brackets being provided with bearings, rock shafts carried by pairs of the bearings, an arm projecting downwardly from each shaft and carrying a roller, idler shafts supported beneath the frame, discs mounted on the opposite ends of the idler shafts, blades secured to the peripheries of the discs, means connected with the rock shafts for rotating the same and for elevating the rollers above the discs.

2. A stalk cutter comprising a frame, a beam connected to the frame intermediate the ends thereof and dividing the frame into a plurality of sections, a plate secured to the frame and to the beam, brackets located upon opposite sides of the beam and connected to the plates, brackets projecting from the ends of the frame and disposed in alinement with the first-mentioned brackets, said brackets being provided with bearings, rock shafts carried by pairs of the bearings, an arm projecting downwardly from each shaft and carrying a roller, idler shafts supported beneath the frame, discs mounted on opposite ends of the idler shafts, blades secured to the peripheries of the discs, means connected with the rock shafts for rotating the same and for elevating the rollers above the discs, means for removably connecting the blades to the discs, and a draw bar projecting from the frame and in line with the beam.

JOHN FRANKLIN O'KELLEY.